(12) United States Patent
Lüftl

(10) Patent No.: US 12,146,556 B2
(45) Date of Patent: Nov. 19, 2024

(54) DIFFERENTIAL LOCK FOR LOCKING COMPENSATING MOVEMENTS IN A DIFFERENTIAL GEAR

(71) Applicant: ZF Friedrichshafen AG, Friedrichshafen (DE)

(72) Inventor: Julian Lüftl, Tiefenbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/488,198

(22) Filed: Oct. 17, 2023

(65) Prior Publication Data
US 2024/0141973 A1 May 2, 2024

(30) Foreign Application Priority Data
Oct. 27, 2022 (DE) ...................... 10 2022 211 409.4

(51) Int. Cl.
*F16H 48/24* (2006.01)
*F16H 48/32* (2012.01)

(52) U.S. Cl.
CPC ............. *F16H 48/32* (2013.01); *F16H 48/24* (2013.01)

(58) Field of Classification Search
CPC .................................. F16H 48/32; F16H 48/24
USPC ........................................................ 475/231
See application file for complete search history.

(56) References Cited

U.S. PATENT DOCUMENTS

| 3,457,807 A | 7/1969 | Altmann |
| 3,899,938 A | 8/1975 | Crabb |
| 4,549,449 A | 10/1985 | Miller et al. |
| 4,759,232 A | 7/1988 | Roberts |
| 4,960,011 A | 10/1990 | Asano |
| 5,030,181 A | 7/1991 | Keller |
| 5,273,499 A | 12/1993 | Friedl et al. |
| 5,299,986 A | 4/1994 | Fabris et al. |
| 5,342,255 A | 8/1994 | Slesinski et al. |

(Continued)

FOREIGN PATENT DOCUMENTS

| CN | 104482163 A | 4/2015 |
| DE | 1 161 483 | 1/1964 |

(Continued)

OTHER PUBLICATIONS

German Patent Office, German Search Report issued in German application No. 10 2022 211 409.4 (Sep. 11, 2023).

(Continued)

*Primary Examiner* — Roger L Pang
(74) *Attorney, Agent, or Firm* — Finch & Maloney PLLC

(57) ABSTRACT

A differential lock for locking compensation movements between drive output shafts (4) in a differential gearbox of a vehicle is disclosed. In the locking condition, at least one of the drive output shafts (4) is connected with interlock to a differential cage (2) connected to a drive input, where a sliding sleeve (5) is arranged coaxially relative to the drive output shaft (4) and connected rotationally fixed to the drive output shaft (4). The sliding sleeve can be moved by means of a piston element (6) in such manner that radial-side external teeth (7) of the sliding sleeve (7) can be brought into engagement with radial-side internal teeth (8) of the differential cage (2). In addition, a differential gearbox with the differential lock is proposed.

15 Claims, 2 Drawing Sheets

(56) References Cited

U.S. PATENT DOCUMENTS

| | | | |
|---|---|---|---|
| 5,947,859 A * | 9/1999 | McNamara | F16H 48/24 |
| | | | 425/231 |
| 6,450,915 B1 | 9/2002 | Kazaoka | |
| 6,582,334 B1 | 6/2003 | Noll | |
| 6,620,073 B2 | 9/2003 | Kazaoka et al. | |
| 7,527,575 B2 | 5/2009 | Salg et al. | |
| 9,422,988 B2 | 8/2016 | Beesley et al. | |
| 2002/0103053 A1 | 8/2002 | Thompson | |
| 2004/0248692 A1 | 12/2004 | Bryson et al. | |
| 2005/0070393 A1 | 3/2005 | DeGowske et al. | |
| 2006/0247087 A1 | 11/2006 | Pontanari et al. | |
| 2006/0276298 A1 | 12/2006 | Rodgers et al. | |
| 2007/0037655 A1 * | 2/2007 | Salg | F16H 48/24 |
| | | | 475/237 |
| 2007/0219041 A1 | 9/2007 | Huber et al. | |
| 2011/0136611 A1 | 6/2011 | Martin, III | |
| 2011/0269593 A1 * | 11/2011 | Knowles | F16H 48/34 |
| | | | 475/84 |

FOREIGN PATENT DOCUMENTS

| | | |
|---|---|---|
| DE | 1 948 616 | 4/1971 |
| DE | 40 21 653 A1 | 1/1991 |
| DE | 10 2018 210 691 A1 | 1/2020 |
| GB | 1 382 926 | 2/1975 |
| GB | 1 429 492 | 3/1976 |
| GB | 1 474 518 | 5/1977 |
| GB | 1 548 080 | 7/1979 |
| WO | 00/61972 | 10/2000 |
| WO | 2010/005411 A1 | 1/2010 |

OTHER PUBLICATIONS

German Patent Office, German Search Report issued in German application No. 10 2022 211 408.6 (Sep. 11, 2023).
United States Patent and Trademark Office, Office Action issued in U.S. Appl. No. 18/488,205, (filed Feb. 20, 2024).

* cited by examiner

DIFFERENTIAL LOCK FOR LOCKING COMPENSATING MOVEMENTS IN A DIFFERENTIAL GEAR

RELATED APPLICATIONS

This application claims the benefit of and right of priority under 35 U.S.C. § 119 to German Patent Application no. 10 2022 211 409.4, filed on 27 Oct. 2022, the contents of which are incorporated herein by reference in its entirety.

FIELD OF THE DISCLOSURE

The present invention relates to a differential lock for locking compensating movements between drive output shafts in a differential gearbox of a motor vehicle. In addition, the invention relates to a differential gearbox with a differential lock.

BACKGROUND

For example, from the document WO 2010/005411 A1, a differential lock for a vehicle differential is known. The vehicle differential comprises a left-hand and a right-hand axle shaft, which extend through the differential housing and can rotate about a rotation axis. Two lateral gearwheels are arranged inside the differential housing, each of them respectively connected rotationally fixed to one of the axle shafts, wherein the lateral gearwheels mesh with differential gearwheels. A locking collar is connected rotationally fixed to one of the axle shafts and can be moved along the axle shaft between an unlocked position and a locking position. In the locking position the locking collar engages, by means of claws arranged on the axial side, with corresponding claws arranged on the axial side on the differential housing and thereby fixes the differential housing to rotate with the locking collar. The axial-side claws facing toward one another must be appropriately dimensioned in order to be able to transmit a desired locking torque by means of the differential lock. Consequently, considerable axial and radial fitting space is required for the known differential lock.

SUMMARY

The purpose of the present invention is to propose a differential lock and a differential gearbox which, to transmit a desired locking torque, are designed as simply and compactly as possible.

According to the invention, this objective is achieved by the features disclosed herein. Advantageous and claimed further developments emerge from the claims, the description, and the drawings.

Thus, a differential lock for locking compensation movements between drive output shafts of a differential gearbox of a vehicle is proposed, wherein, in the locking condition of the differential lock, at least one of the drive output shafts is connected with interlock to a differential cage connected to a drive input. To ensure the transmission of a desired locking torque by the differential lock in as simply designed and compact a manner as possible, it is provided that a sliding sleeve or the like is arranged coaxially with the drive output shaft and connected rotationally fixed to the drive output shaft can be moved axially by means of a piston element or the like, in such manner that radial external teeth of the sliding sleeve can be brought into engagement with radial internal teeth of the differential cage.

In that way, by virtue of the radially directed locking teeth on the sliding sleeve and the differential cage, a differential lock optimized in regard to the fitting space required is produced. Thanks to the coaxial arrangement relative to the drive output shaft an essentially nested design is produced, which ensures on the one hand a particularly space-saving structure, and on the other hand sufficiently effective locking torque transmission by virtue of the radial locking teeth provided.

For example, if the external teeth on the sliding sleeve and the internal teeth on the differential cage form locking teeth in the form of interlocking splines, this has the advantage that these can be formed as both flank-bearing or flank-centered, or even diameter-bearing or diameter-centered. Consequently, a predetermined clearance at the tooth tip and/or at the tooth root of the splines can be provided. For example, standardized splines in accordance with DIN 5480 can also be used, which has further advantages for production.

With the proposed differential lock, it is particularly advantageous that despite the space-saving structure, and thanks to the choice of the axial length of the locking teeth and the choice of the axial overlap of the locking teeth on the two interlocking coupling partners, namely, the sliding sleeve and the differential cage, a desired transmitted locking torque can be set or produced by the differential lock.

Since the sliding sleeve and the piston element are each are in the form of sleeves, annular cylinders, or the like, and are arranged in a radially nested manner between the drive output shaft and a housing that accommodates the drive output shaft, a differential lock which is particularly compact as viewed in the axial direction is produced.

In order to bring about as simple as possible an actuation of the axial movement of the sliding sleeve along the drive output shaft so as to produce the locking condition of the differential lock, it is provided that the sliding sleeve, at least part of which is arranged radially inside the piston element, is mounted by means of a bearing element or the like on the piston element fixed onto the housing. In that way the axial movement of the piston element can be transferred to the rotating sliding sleeve in a simple manner.

A particularly simply designed embodiment can provide that in order to support it axially and radially, the said bearing element is arranged on one side against an internal diameter step of the piston element and on the other side against an external diameter step of the sliding sleeve.

To produce the axial movement of the sliding sleeve, it can preferably be provided in the proposed differential lock that the piston element is acted upon by pressure, for example pneumatically or hydraulically, so that the axial movement is transmitted by the said action of pressure, via the bearing element, to the sliding sleeve.

To bring about a prestressing of the sliding sleeve, in the context of a closely related further development of the invention, it can be provided that the sliding sleeve is prestressed toward the piston element by a spring element or the like, the spring element being arranged coaxially with the drive output shaft and at least in part radially inside the sliding sleeve. As the spring element, a helical spring or the like, for example, in the form of a compression spring, can be used. This not only makes for a particularly space-saving design of the proposed differential lock, but it also ensures that a certain prestressing force acts upon the differential gearwheels or axial bevel gearwheels, which force has a beneficial effect on the acoustics and contact pattern of the teeth.

Since the spring element or compression spring rests on one side against an axial bevel gearwheel connected rotationally fixed to the drive output shaft and on the other side against the sliding sleeve, the spring can be designed such that by virtue of the spring force the contact pattern of the locking teeth is optimized.

The objective addressed by the invention is also achieved by a differential gearbox comprising at least one differential lock as described above. This achieves the advantages already described and other as well. Preferably, as the said differential gearbox a differential gearbox with bevel gearwheels is equipped with the differential lock.

BRIEF DESCRIPTION OF THE DRAWINGS

Below, the present invention is explained in greater detail with reference to the drawings, which show.

DETAILED DESCRIPTION

Figure 1:
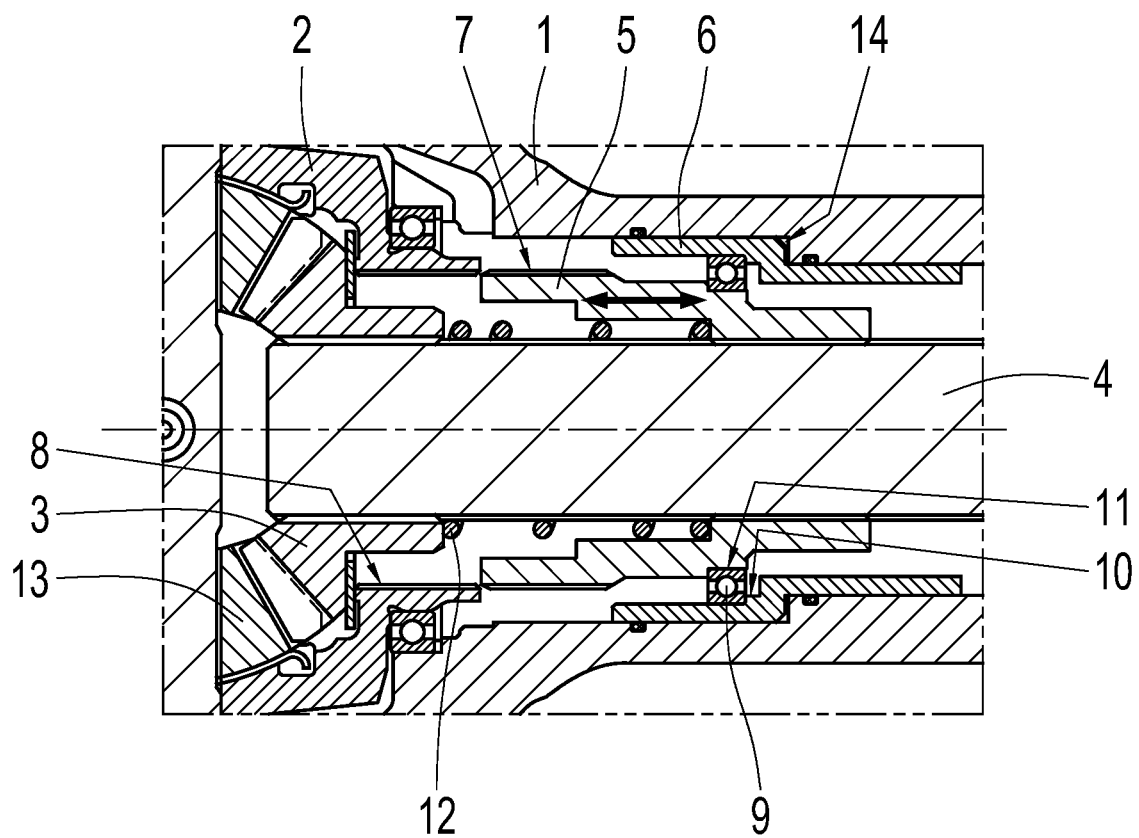
FIG. 1: A schematically represented, sectioned view of part of a differential gearbox according to the invention, with a differential lock according to the invention in its non-locking condition.
Figure 2:
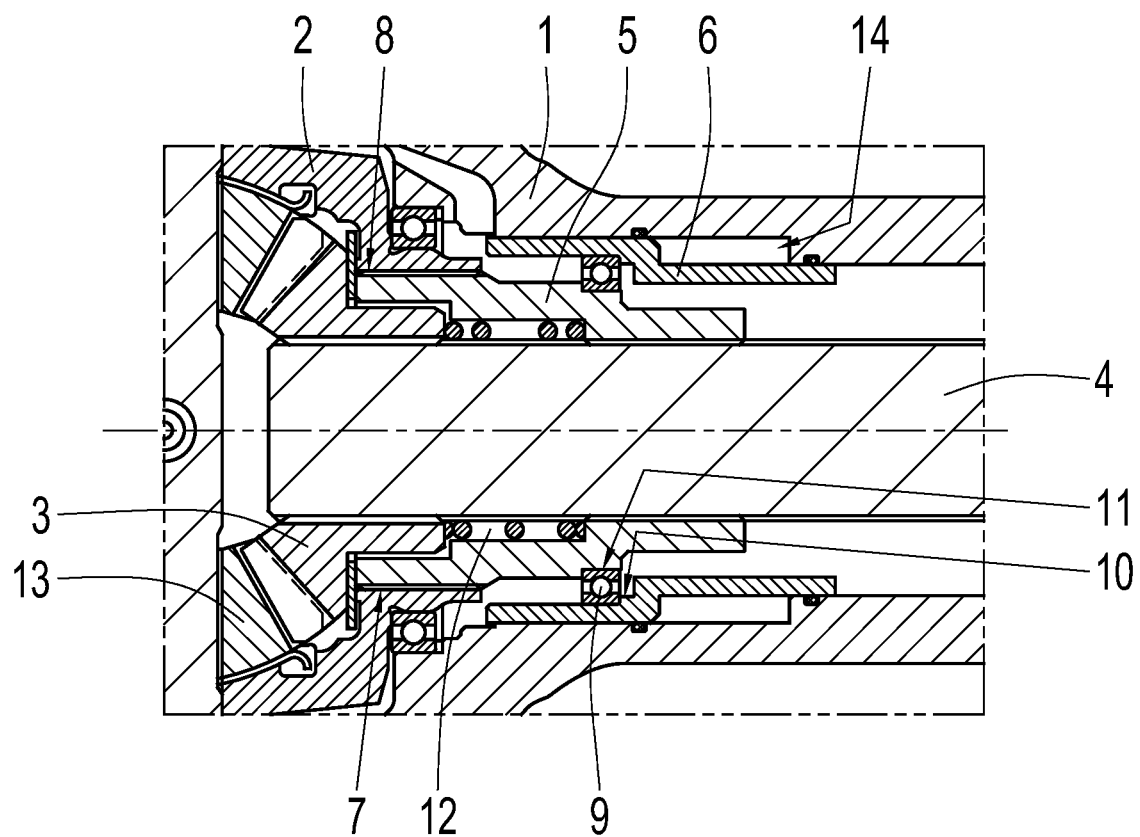
FIG. 2: A schematically represented, sectioned view of the differential gearbox with the differential lock in the locking condition.

FIGS. 1 and 2 show, as examples, a possible embodiment variant of a differential gearbox according to the invention in the form, for example, of a bevel gear differential gearbox of a vehicle, with a differential lock according to the invention in the non-locking condition and in the locking condition, respectively.

The bevel gear differential gearbox is arranged with the differential lock in a housing 1. The bevel gear differential gearbox comprises a driven differential cage 2, which drives associated drive output shafts 4 by way of differential gearwheels 13 and axle bevel gearwheels 3.

In the locking condition of the differential lock at least one of the drive output shafts 4 is connected with interlock to the differential cage 2, so that there is no compensating movement between the drive output shafts 4.

As the differential lock, in the bevel gear differential gearbox an interlocking coupling with a first coupling partner and a second coupling partner is provided. The first coupling partner is provided on one of the drive output shafts 4 and the second coupling partner on the differential cage 2. Thus, the bevel gear differential gearbox comprises an integrated differential lock. The differential lock is arranged coaxially with a rotation axis of the drive output shafts 4.

The differential lock comprises, as the first coupling partner, a sliding sleeve 5 coaxial with the drive output shaft 4 and connected rotationally fixed thereto, which sleeve can be moved axially by means of a piston element 6 in such manner that external teeth 7 on the radial side of the sliding sleeve 5 can be brought into engagement with radial-side internal teeth 8 of the differential cage 2 which forms the second coupling partner. Thus, the bevel gear differential gearbox comprises an integrated differential lock which is arranged coaxially. Thanks to the nested configuration the differential lock is optimized as regards both the radial and the axial fitting space.

The external teeth 7 on the sliding sleeve 5 and the internal teeth 8 on the differential cage 2 form interlocking locking teeth in the form of splines. Depending on the overlap chosen between the external teeth 7 on the sliding sleeve 5 and the internal teeth 8 on the differential cage 2, a predetermined locking torque is determined which can be transmitted by the differential lock.

As shown by FIGS. 1 and 2, both the sliding sleeve 5 and the piston element 6 that moves the sliding sleeve 5 are in each case shell-shaped or annular-cylinder-shaped and are arranged radially nested between the drive output shaft 4 and the housing 1 that accommodates the drive output shaft 4. In that way the differential lock can be radially as small as possible and positioned between the drive output shaft 4 in the form of a stub shaft and the axle-tube housing 1.

In the differential lock it is provided that the sliding sleeve 5 arranged radially at least partially inside the piston element 6 is mounted on the piston element 6 fixed to the housing by means of a bearing element 9. The bearing element 9, which can be, for example, in the form of an axial and radial roller bearing or the like, is arranged for its axial and radial support against an internal diameter step 10 of the piston element 6 on one side and against an external diameter step 11 of the sliding sleeve 5 on the other side. The axial movement of the sliding sleeve 5, enabled by virtue of the bearing element 9, is produced by the action of pressure 14 in the piston element 6. The pressure 14 is delivered via a pressure chamber, in that the shifting force produced for example by compressed air or the like, acts upon the piston element 6.

To hold the sliding sleeve 5 in a non-locking condition of the differential lock, the sliding sleeve 5 is prestressed by a spring element 12 toward the piston element 6, the spring element 12 being arranged coaxially with respect to the drive output shaft 4 and being at least partially radially inside the sliding sleeve 5. The spring element 12 is supported on one side against the bevel gearwheel 3 connected rotationally fixed to the drive output shaft 4, and on the other side against the sliding sleeve 5. The shifting force due to the action of pressure 14 is larger than the spring force exerted by the spring element 12. As soon as the pressure 14 is relieved, the spring element 12 ensures that the sliding sleeve 5 is again moved away from the differential cage 2 and the differential lock is disengaged.

Thus, the differential lock is also optimized in relation to the axial fitting space required, since the spring element 12 needed for the prestressing is positioned between the axle bevel gearwheel 3 and the sliding sleeve 5. The positioning of the spring element 12 between the axle bevel gearwheel 3 and the sliding sleeve 5 also ensures that a certain amount of prestressing force acts upon the differential gearwheels 13. This results in optimization in relation to acoustics and contact pattern.

In the proposed differential lock, the differential cage 2, the axle bevel gearwheel 3, the sliding sleeve 5, and the drive output shaft 4 are arranged coaxially on a common rotation axis, and the drive output shaft 4 is connected rotationally fixed to the axle bevel gearwheel 3 and the sliding sleeve 5.

FIG. 2 shows the locking condition in which the axial movement of the sliding sleeve 5 in the direction toward the differential cage 2, to form the radial locking teeth by applying pressure 14 to the piston element 6 arranged coaxially with the sliding sleeve 5, has been brought about, whereby the piston element 6 transmits the displacing force to the sliding sleeve 5 by way of the bearing element 9.

When the action of pressure 14 on the piston element 6 is discontinued, the compression spring force of the spring element 12 moves the sliding sleeve 5 axially away from the differential cage 2 as shown in FIG. 1, which corresponds to the non-locking condition of the differential lock.

INDEXES

1 Housing
2 Differential cage

3 Axle bevel gearwheel
4 Drive output shaft
5 Sliding sleeve
6 Piston element
7 External teeth of the sliding sleeve
8 Internal teeth of the differential cage
9 Bearing element
10 Internal diameter step of the piston element
11 External diameter step of the sliding sleeve
12 Spring element
13 Differential gearwheel
14 Action of pressure

The invention claimed is:

1. A differential lock configured for locking compensation movement between drive output shafts in a differential gearbox of a vehicle, wherein, in a locking condition, at least one of the drive output shafts is connected with interlock to a differential cage connected to a drive input, and the differential lock comprising:
    a sliding sleeve arranged coaxially with a drive output shaft and continuously rotationally fixedly connected directly to the drive output shaft;
    radial-side external teeth arranged on the sliding sleeve;
    the differential cage has radial-side internal teeth; and
    a piston element arranged to axially move the sliding sleeve in such a manner that the radial-side external teeth, on the sliding sleeve, can be brought into engagement with the radial-side internal teeth, on the differential cage, to engage the differential lock.

2. The differential lock according to claim 1, wherein the external teeth of the sliding sleeve and the internal teeth of the differential cage form locking teeth in the form of interlocking splines.

3. The differential lock according to claim 1, wherein a predetermined locking torque can be produced based on an overlap of the external teeth of the sliding sleeve and the internal teeth of the differential cage.

4. The differential lock according to claim 1, wherein each of the sliding sleeve and the piston element is shell-shaped and is radially nested between the drive output shaft and a housing that accommodates the drive output shaft.

5. The differential lock according to claim 4, wherein the sliding sleeve is arranged at least partially inside the piston element, the sliding sleeve is mounted on the piston element, and the piston element is fixed to the housing by a bearing element.

6. The differential lock according to claim 5, wherein the bearing element rests, on one side, against an internal diameter step of the piston element and, on another side, against an external diameter step of the sliding sleeve.

7. The differential lock according to either of claim 6, wherein axial movement of the sliding sleeve is configured to be brought about by the action of pressure on the piston element by way of the bearing element.

8. The differential lock according to claim 1, further comprising:
    a spring element arranged coaxially relative to the drive output shaft and at least partially radially inside the sliding sleeve, and the sliding sleeve is prestressed toward the piston element by the spring element.

9. The differential lock according to claim 8, wherein the spring element is supported, on one side, against an axle gearwheel connected rotationally fixed to the drive output shaft, and, on another side, against the sliding sleeve.

10. A differential gearbox comprising the differential lock according to claim 1.

11. A differential lock configured for locking compensation movement between at least one drive output shaft of a differential gearbox of a vehicle, wherein, in a locked condition of the differential lock, the at least one of the drive output shaft is connected with interlock to a differential cage connected to a drive input, and the differential lock comprising:
    a sliding sleeve arranged coaxially with the at least one drive output shaft with the sliding sleeve continuously rotationally fixedly connected directly to the at least one drive output shaft;
    the sliding sleeve has radial-side external teeth arranged thereon;
    the differential cage has radial-side internal teeth; and
    a piston element arranged for axially moving the sliding sleeve from an unlocked position, in which the at least one of the drive output shaft is able to rotate relative to the differential cage, to a locking position in which the radial-side external teeth, on the sliding sleeve, engage with the radial-side internal teeth, on the differential cage, so that the at least one of the drive output shaft is coupled to and rotates with the differential cage.

12. The differential lock according to claim 11, wherein a spring element is arranged coaxially relative to the at least one drive output shaft and at least partially radially inside the sliding sleeve, and the sliding sleeve is prestressed toward the piston element by the spring element in a stepped region of the sliding sleeve.

13. The differential lock according to claim 11, wherein a step of the sliding sleeve spaces internal teeth of the sliding sleeve from the radial-side external teeth of the sliding sleeve.

14. The differential lock according to claim 12, wherein a first step of the sliding sleeve spaces a first portion of the sliding sleeve away from the at least one drive output shaft to facilitate accommodating the spring element while a second step of the sliding sleeve spaces a second portion of the sliding sleeve further away from the at least one drive output shaft to facilitate engagement with the differential cage.

15. A differential lock configured for locking compensation movement between at least one drive output shaft of a differential gearbox of a vehicle, wherein, in a locked condition of the differential lock, the at least one of the drive output shaft is connected with interlock to a differential cage connected to a drive input, and the differential lock comprising:
    a sliding sleeve arranged coaxially with a drive output shaft with the sliding sleeve continuously rotationally fixedly connected directly to the drive output shaft, and the sliding sleeve only has a locked position and an unlocked position;
    the sliding sleeve has radial-side external teeth arranged thereon;
    the differential cage has radial-side internal teeth; and
    a piston element arranged for axially moving the sliding sleeve from the unlocked position, in which the at least one of the drive output shaft is able to rotate relative to the differential cage, to the locked position in which the radial-side external teeth, on the sliding sleeve, engage with the radial-side internal teeth, on the differential cage so that the at least one of the drive output shaft is coupled to and rotates with the differential cage.

* * * * *